United States Patent
Frye et al.

(10) Patent No.: US 12,128,984 B1
(45) Date of Patent: Oct. 29, 2024

(54) MULTI-FUNCTION HAND CONTROL FOR VEHICLE

(71) Applicant: Harley-Davidson Motor Company, Inc., Milwaukee, WI (US)

(72) Inventors: Seth T. Frye, Wauwatosa, WI (US); Michael C. Heit, Wauwatosa, WI (US); Nicholas T. J. Paul, Wauwatosa, WI (US)

(73) Assignee: Harley-Davidson Motor Company, Inc., Milwaukee, WI (US)

( * ) Notice: Subject to any disclaimer, the term of this patent is extended or adjusted under 35 U.S.C. 154(b) by 7 days.

(21) Appl. No.: 18/139,245

(22) Filed: Apr. 25, 2023

(51) Int. Cl.
*B62K 23/02* (2006.01)

(52) U.S. Cl.
CPC ................... *B62K 23/02* (2013.01)

(58) Field of Classification Search
CPC ........ B62K 23/02; B62K 11/14; H01H 25/04; H01H 25/00; H01H 25/041; H01H 25/06; H01H 2009/068; A63F 13/24; A63F 13/40; B60K 2360/113; B60K 2360/137; B60K 35/10; G05G 1/02; G05G 2009/04744
USPC .................................. 180/321, 315
See application file for complete search history.

(56) References Cited

U.S. PATENT DOCUMENTS

| | | | |
|---|---|---|---|
| 4,256,931 A * | 3/1981 | Palisek | H01H 25/041 200/6 A |
| 4,475,015 A * | 10/1984 | Kobayashi | H01H 25/002 200/17 R |
| 6,047,962 A * | 4/2000 | Popadiuk | A63F 7/027 273/121 A |
| 2015/0274246 A1 * | 10/2015 | Ichikawa | B62K 11/14 74/471 R |
| 2016/0293360 A1 * | 10/2016 | Osanai | H01H 25/04 |
| 2018/0170277 A1 * | 6/2018 | Yamamoto | B62K 11/00 |
| 2020/0062332 A1 * | 2/2020 | Osanai | B62K 23/02 |
| 2020/0339211 A1 * | 10/2020 | Kaida | B62K 11/14 |

FOREIGN PATENT DOCUMENTS

| | | | |
|---|---|---|---|
| DE | 102015216186 A1 | * | 3/2017 |
| JP | 2008305604 A | * | 12/2008 |
| WO | WO-2023171442 A1 | * | 9/2023 |
| WO | WO-2023189091 A1 | * | 10/2023 |

* cited by examiner

*Primary Examiner* — James A Shriver, II
*Assistant Examiner* — Matthew D Lee
(74) *Attorney, Agent, or Firm* — Michael Best & Friedrich LLP

(57) ABSTRACT

A multi-function hand control for a vehicle includes a housing configured for support on a handlebar having an inboard end, an outboard end, and a front surface configured to face a vehicle operator. A plurality of buttons are configured for operation by the vehicle operator's thumb with the operator's hand positioned adjacent the outboard end of the housing, the plurality of buttons including an inboard button, an outboard button, and a center button between the inboard and outboard buttons. Each one of the plurality of buttons is operable from an at-rest position to an activated position by directly pressing inward on an outer surface thereof. The inboard button is additionally operable from its at-rest position to its activated position by pressing an outboard portion of the center button in a direction toward the inboard button.

20 Claims, 10 Drawing Sheets

MULTI-FUNCTION HAND CONTROL FOR VEHICLE

BACKGROUND

Modern vehicles, including motorcycles, may include numerous electronics related to both primary vehicle functions and control of a media center. Often times, numerous selectors such as individually-operable buttons are clustered at respective pods adjacent the locations where the operator's hands may be located during operation of the vehicle. For example, multi-function hand controls can be located immediately inboard of left and right hand grips of a steering device. All the required functions are provided by actuation of the rider's thumbs during use of the vehicle. However, thumb reach among some operators is significantly less than others, and the buttons must maintain reasonable sizing and spacing to afford proper control for operators with larger thumbs and/or wearing gloves.

SUMMARY

In one aspect, the invention provides a multi-function hand control for a vehicle. The hand control includes a housing configured for support on a handlebar having an inboard end, an outboard end, and a front surface configured to face a vehicle operator. A plurality of buttons are configured for operation by the vehicle operator's thumb with the operator's hand positioned adjacent the outboard end of the housing, the plurality of buttons including an inboard button, an outboard button, and a center button between the inboard and outboard buttons. Each one of the plurality of buttons is operable from an at-rest position to an activated position by directly pressing inward on an outer surface thereof. The inboard button is additionally operable from its at-rest position to its activated position by pressing an outboard portion of the center button in a direction toward the inboard button.

In another aspect, the invention provides a multi-function hand control including a directional pad defining a plurality of individually selectable directional controls. A center button is provided at a center position between the plurality of individually selectable directional controls, the center button configured to be pressed inward for activation. At least one of the plurality of individually selectable directional controls is selectable by movement of the center button away from the center position.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
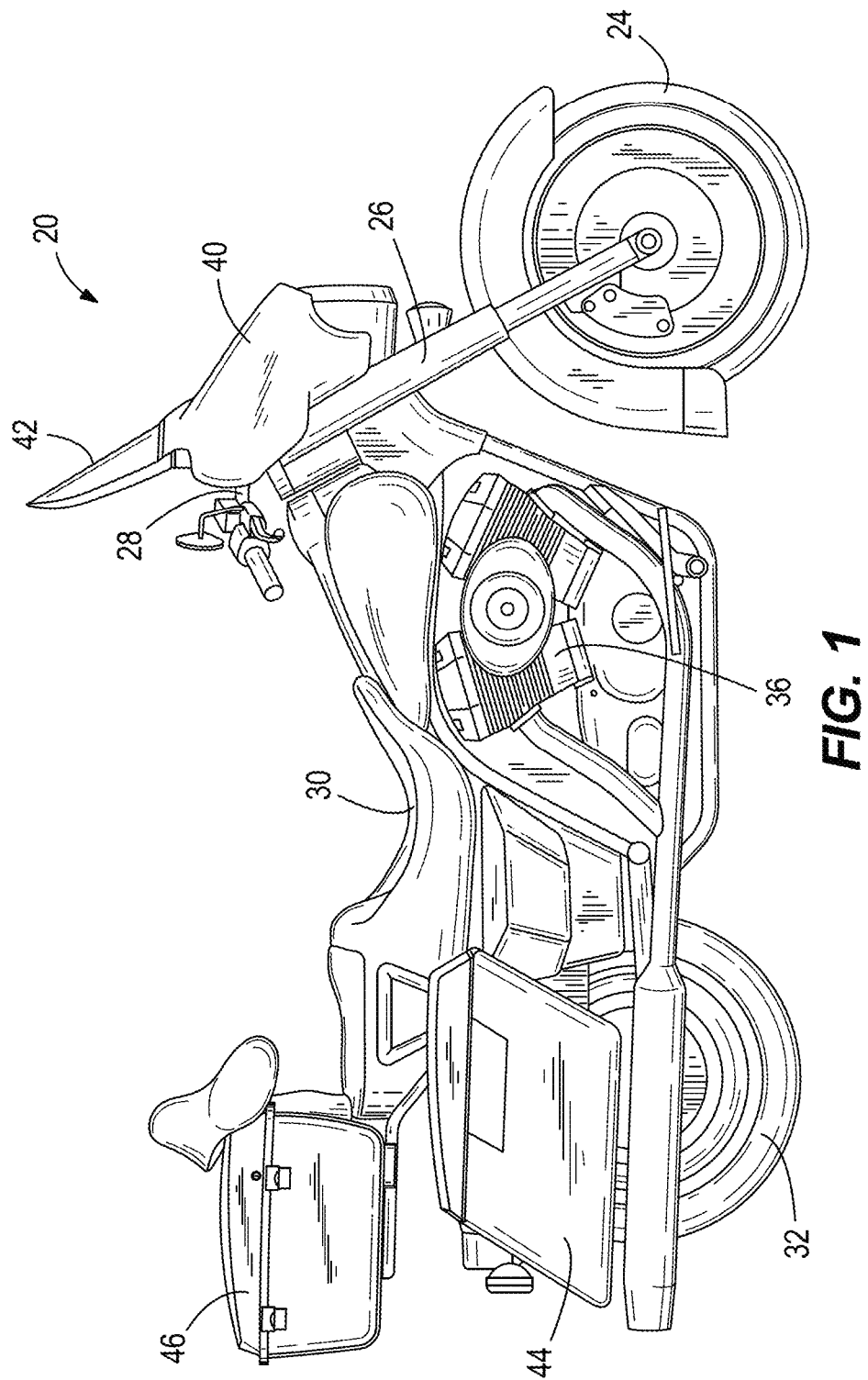
FIG. 1 is a side view of a motorcycle according to one embodiment of the present disclosure.

FIG. 1 illustrates a motorcycle 20 according to one construction. The motorcycle 20 is configured for operation by a straddling rider (not shown). The motorcycle 20 includes a front wheel 24, the direction of which is controlled by the rider through manipulation of a handlebar 28. The front wheel 24 is not driven, only steerable. As shown, there is a single front wheel 24. The front wheel 24 is supported rotatably at a front wheel axis by a fork 26 that is connected between the handlebar 28 and the front wheel 24. The front wheel 24 is situated at a lateral or widthwise center C (FIG. 2) of the motorcycle 20 (along with the handlebar 28, the front fork 26, and a seat 30 for supporting the motorcycle operator). The motorcycle 20 includes a single rear wheel 32 defining a single track with the front wheel 24, such that the rider is responsible for maintaining balance of the motorcycle 20 with respect to the ground. However, the motorcycle 20 can have two rear wheels in other constructions, in a known "trike" configuration that is self-stable. The rear wheel(s) 32 are driven by the motorcycle's power unit 36, which can be internal combustion, electric, a combination thereof, or operated with another alternative energy source. According to FIGS. 1 and 2, the motorcycle 20 is a touring motorcycle or so-called "heavyweight" motorcycle configured for long-distance touring. The motorcycle 20 includes a large front fairing 40 with windshield 42, as well as a complement of luggage compartments (e.g., saddlebags 44 flanking the rear wheel 32 and a high-mounted trunk box 46 above the rear wheel 32). The motorcycle 20 as shown represents just one possible embodiment of a vehicle in which features described below may be incorporated.

Figure 2:
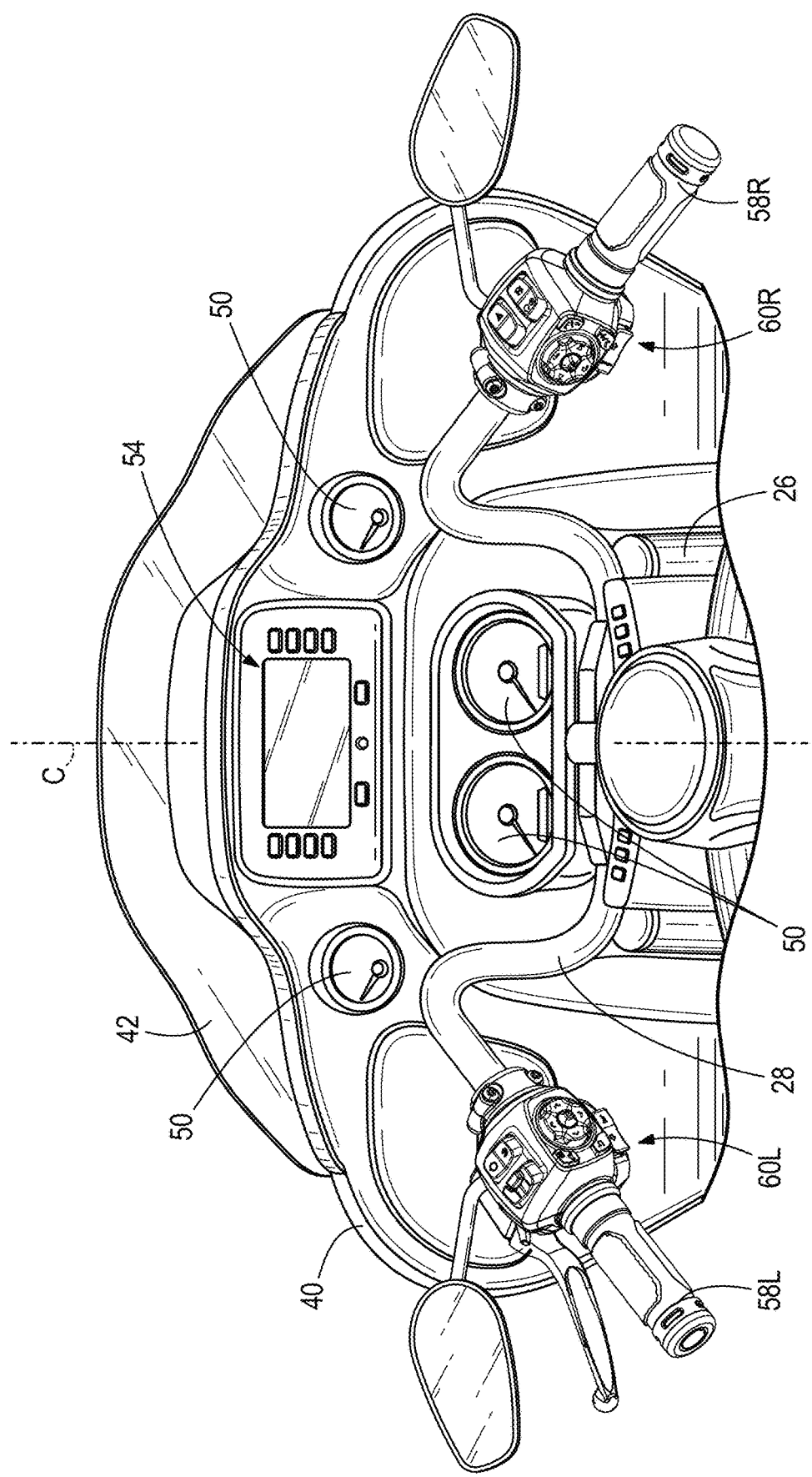
FIG. 2 is a view from a rider's perspective of the motorcycle of FIG. 1.

FIG. 2 illustrates the operator's control center or cockpit of the motorcycle 20, including not only the handlebar 28 as a steering control, but also a plurality of gauges 50, a media center 54 with digital display, and various switchgear configured to manipulate features of the motorcycle 20, including both primary vehicle functions (e.g., run/stop, start, headlights, turn indicators, horn, etc.) and media center controls (e.g., play/pause, volume, seek, mute, menu navigation and selection, etc.). Although the media center 54 may optionally include one or more physical buttons located adjacent the digital display, the switchgear for controlling functions of the motorcycle 20 may be largely clustered within reach of the operator's thumbs while their hands remain on the left and right hand grips 58L, 58R provided at the outboard ends of the handlebar 28. The hand grips 58L, 58R are designated portions for receiving the operator's hands (being gripped) at the outboard ends of the vehicle's steering control. Adjacent an inboard end of each of the hand grips 58L, 58R, the motorcycle includes a corresponding multi-function hand control 60L, 60R. Each multi-function hand control 60L, 60R is a unit including a switchpack of a plurality of switchgear (buttons, switches, etc.) configured for operation by the rider's thumbs for controlling functions and features of the motorcycle 20 during operation thereof, while the hands remain in position for controlled steering.

Figure 3A:
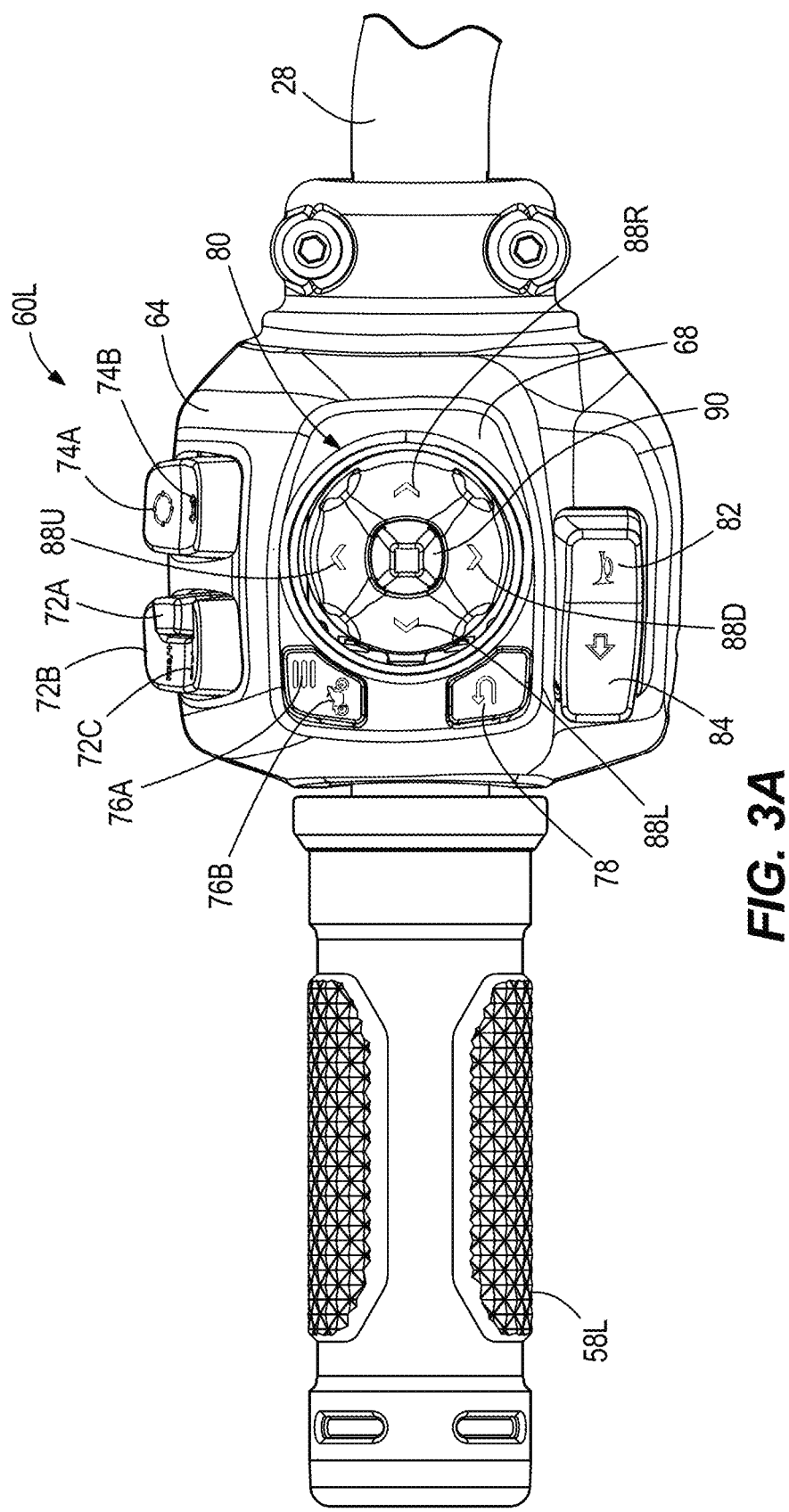
FIG. 3A is a detail view of a left side of a steering device of the motorcycle of FIGS. 1 and 2, including a left grip and left multi-function hand control.
Figure 4A:
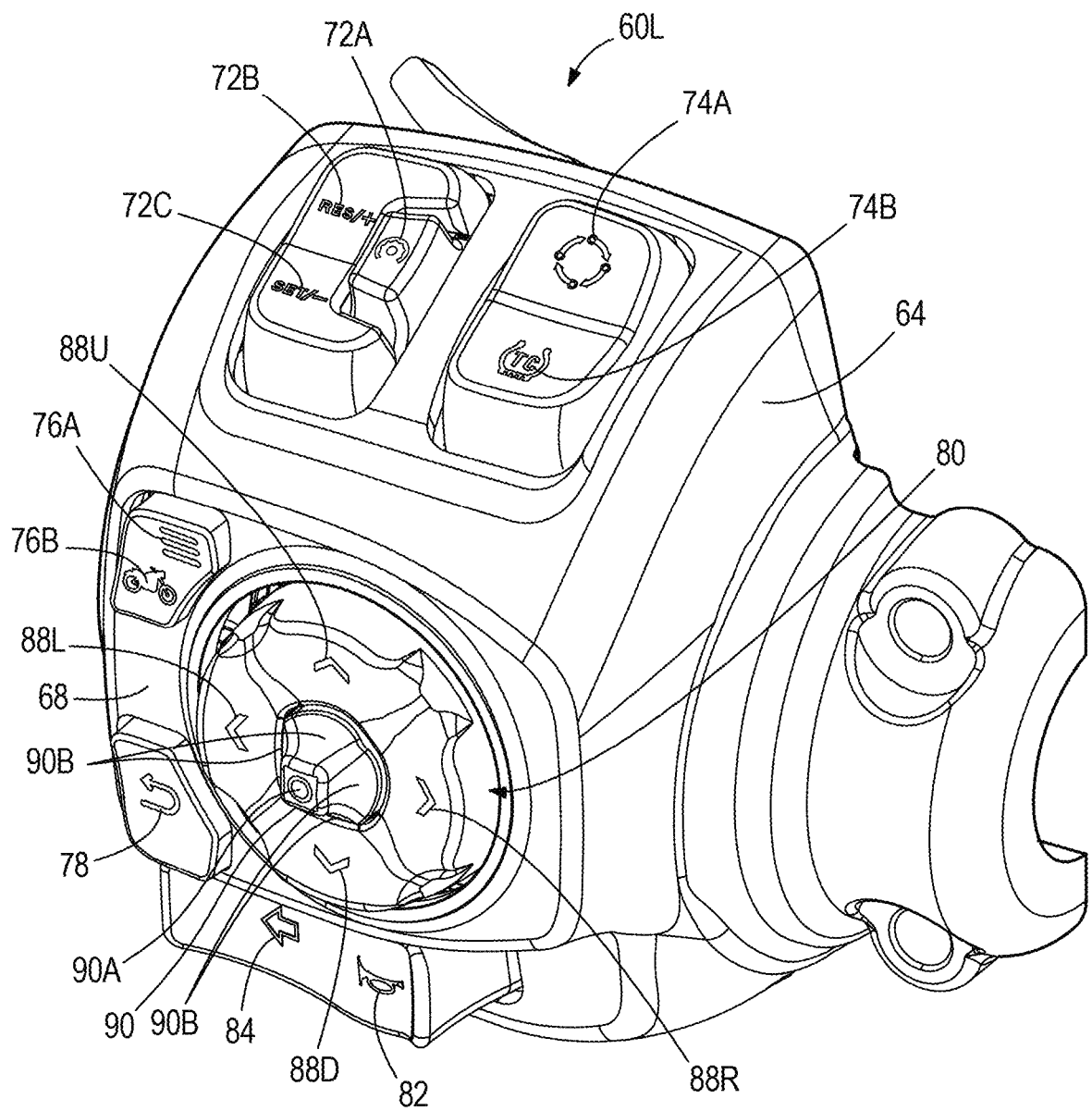
FIG. 4A is a detail view of the left multi-function hand control of FIG. 3A.

FIGS. 3A and 4A illustrate the left multi-function hand control 60L in further detail. As shown, the left multi-function hand control 60L includes a housing 64 configured for support on the handlebar 28. For example, the housing 64 can be formed in two pieces that clamp together to sandwich a circular profile of the handlebar 28. The housing 64 has an inboard end facing toward the widthwise center C and an opposite outboard end situated against or in very close proximity to the inboard end of the left hand grip 58L. The housing 64 has a front surface 68 configured to face the operator. A plurality of buttons are provided in the housing 64, at least on the front surface 68 but not limited thereto, and the buttons are actuable by movement relative to the housing 64. Although some of the buttons may be implemented as switches that toggle and/or latch between different positions, while others are simple buttons configured to be actuated by pressing them in with respect to the housing 64, the term "button" is used throughout for simplicity. Some of the buttons are grouped together, while others are separated. In the illustrated construction, the buttons include the following. Cruise control On, Resume/+, and Set/– buttons 72A, 72B, 72C, and Trip/Odometer and Traction Control buttons 74A, 74B are provided on a top surface of the housing 64. On the front surface 68, Home and Vehicle Settings buttons 76A, 76B are provided along with a menu Back button 78 and an integrated 5-way control 80. A Horn button 82 and a Turn Signal button 84 are provided below the integrated 5-way control 80 on another (recessed) front surface. The 5-way control 80 incorporates four directional buttons 88L, 88R, 88U, 88D (menu navigation buttons for Left, Right, Up, and Down) and a center button 90 (menu Select). As can be appreciated from the drawings and preceding description, the button 88L for menu navigation Left is an outboard button since it is nearest the left hand grip 58L, and the button 88R for menu navigation Right is an inboard button since it is furthest from the left hand grip 58L. The center button 90 for menu Select is located between the directional buttons 88L, 88R (and also between the additional directional buttons 88U, 88D). Although the four directional buttons 88L, 88R, 88U, 88D are independently operable from respective at-rest positions to respective activated positions for four separate functions, they may be formed integrally as part of a directional pad encircling the center button 90. Thus, the entire directional pad tilts as a unit in the direction of the actuated one of the four directional buttons 88L, 88R, 88U, 88D. The center button 90 is independently actuated from an at-rest position to an activated position by directly pressing inward on an outer surface (i.e., the end or tip 90A) thereof.

Figure 3B:
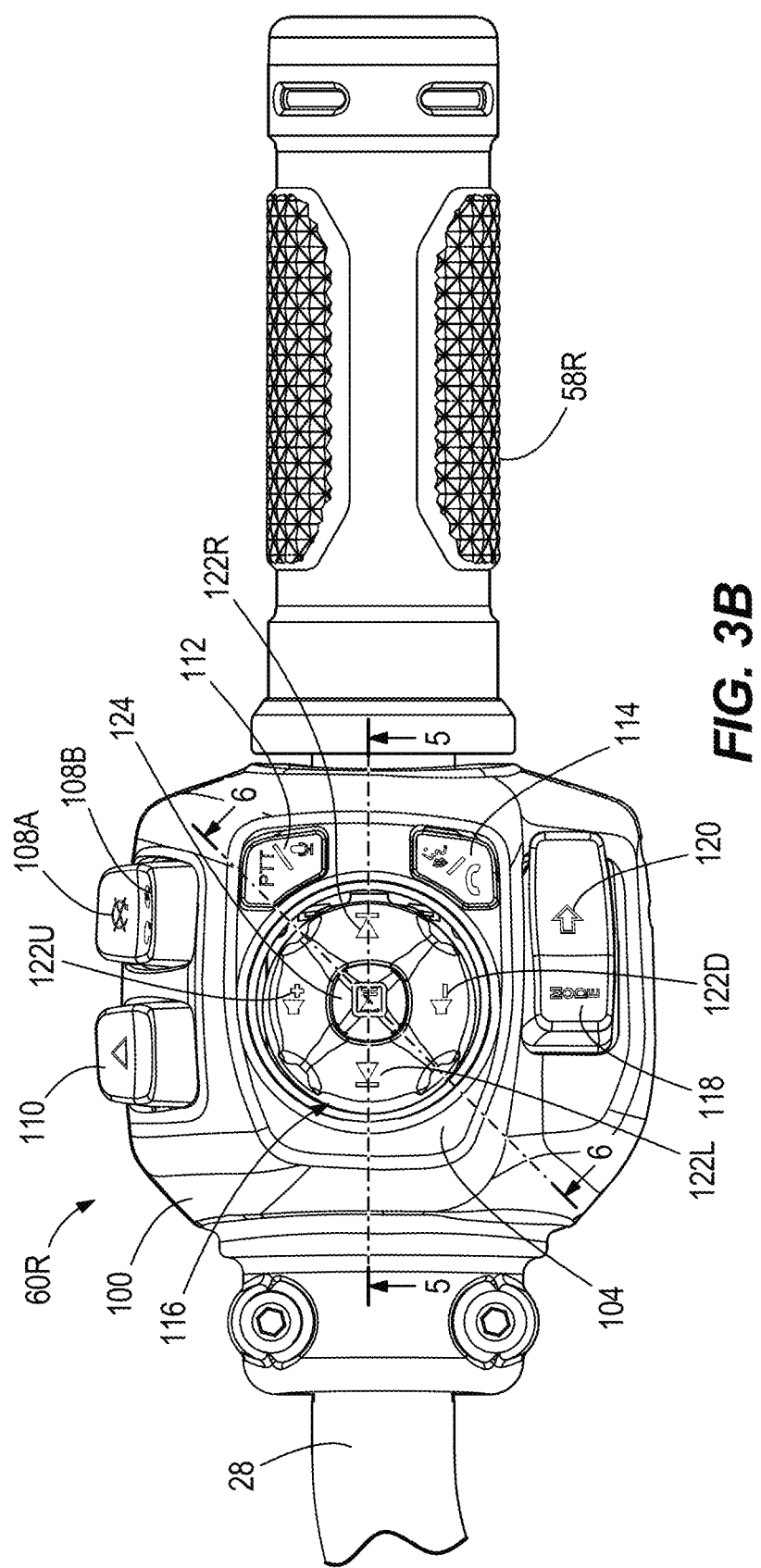
FIG. 3B is a detail view of a right side of a steering device of the motorcycle of FIGS. 1 and 2, including a right grip and right multi-function hand control.
Figure 4B:
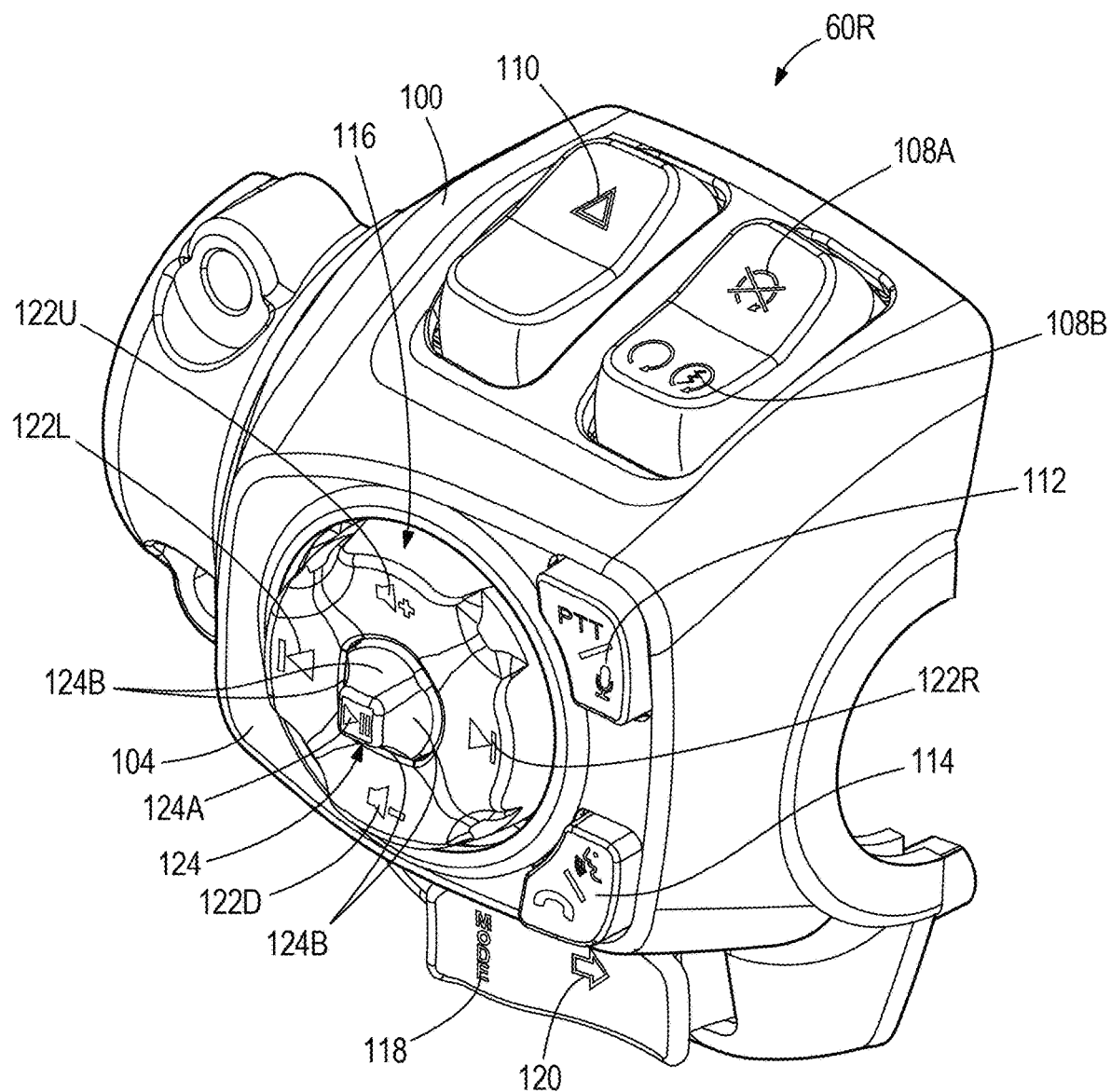
FIG. 4B is a detail view of the right multi-function hand control of FIG. 3B.

FIGS. 3B and 4B illustrate the right multi-function hand control 60R in further detail. As shown, the right multi-function hand control 60R includes a housing 100 configured for support on the handlebar 28. For example, the housing 100 can be formed in two pieces that clamp together to sandwich a circular profile of the handlebar 28. The housing 100 has an inboard end facing toward the widthwise center C and an opposite outboard end situated against or in very close proximity to the inboard end of the right hand grip 58R. The housing 100 has a front surface 104 configured to face the operator. A plurality of buttons are provided in the housing 100, at least on the front surface 104 but not limited thereto, and the buttons are actuable by movement relative to the housing 100. Some of the buttons are grouped together, while others are separated. In the illustrated construction, the buttons include the following. Run-Stop and Electric Start buttons 108A, 108B, and a Hazards button 110 are provided on a top surface of the housing 100. On the front surface 104, push-to-talk (PTT) and Voice Recognition buttons 112, 114 are provided along with an integrated 5-way control 116. A Mode button 118 and a Turn Signal button 120 are provided below the integrated 5-way control 116 on another (recessed) front surface. The 5-way control 116 incorporates four directional buttons 122L, 122R (Previous and Next), 122U, 122D (volume UP, and DOWN) and a center button 124 (Play/Pause). As can be appreciated from the drawings and preceding description, the button 122R for Next is an outboard button since it is nearest the right hand grip 58R, and the button 122L for Previous is an inboard button since it is furthest from the right hand grip 58R. The center button 124 for Play/Pause is located between the directional buttons 122L, 122R (and also between the additional directional buttons 122U, 122D). Although the four directional buttons 122L, 122R, 122U, 122D are independently operable from respective at-rest positions to respective activated positions for four separate functions, they may be formed integrally as part of a directional pad encircling the center button 124. Thus, the entire directional pad tilts as a unit in the direction of the actuated one of the four directional buttons 122L, 122R, 122U, 122D. The center button 124 is independently actuated from an at-rest position to an activated position by directly pressing inward on an outer surface (i.e., at the end or tip 124A) thereof.

In each of the left and right multi-function hand controls 60L, 60R, the 5-way control 80, 116 (and particularly the directional pad formed by the buttons 80L, 80R, 80U, 80D and 122L, 122R, 122U, 122D) has an overall concave or dished shape, with the deepest portion being at the center where the center buttons 90, 124 are located. In each case, the center button 90, 124 protrudes outward from the housing front surface 68, 104 farther than the other buttons of the 5-way control 80, 116. As can be seen from FIGS. 4A and 4B, along with the cross-section of FIG. 5, each center button 90, 124 has a plurality of outer side surfaces 90B, 124B, some or all of which can be concave. In some constructions, each center button 90, 124 has an outer surface including four sides 90B, 124B, forming a pyramid shape culminating at the tip 90A, 124A. However, the tips 90A, 124A can be flat or concave, rather than pointed, to receive a user's thumb tip when actuating the center button 90, 124. With particular reference to the right hand control 60R of FIG. 5, the outboard-facing side surface 124B of the center button 124 and the outside surface of the adjacent outboard button 122R form a continuous concave profile configured to jointly receive and support the user's thumb along the outboard side of the center button 124. In other words, a continuous concavity is formed jointly by the outboard portion of the center button 124 and the outboard button 122R. The shared profile is indicated by the dashed line curve 130 in FIG. 5. A similar arrangement may be provided between any one or more of the other sides 124B of the center button and the respective adjoining buttons 122L, 122U, 122D. Similarly, though not shown separately, the 5-way control 80 of the left hand control 60L can incorporate the same features of the right hand control 60R as shown and described herein. In some constructions, the 5-way control 80 of the left hand control 60L can be a direct mirror of the 5-way control 116 of the right hand control 60R with respect to shapes and manner of operation (while controlling separate functions of the motorcycle 20).

Figure 5:
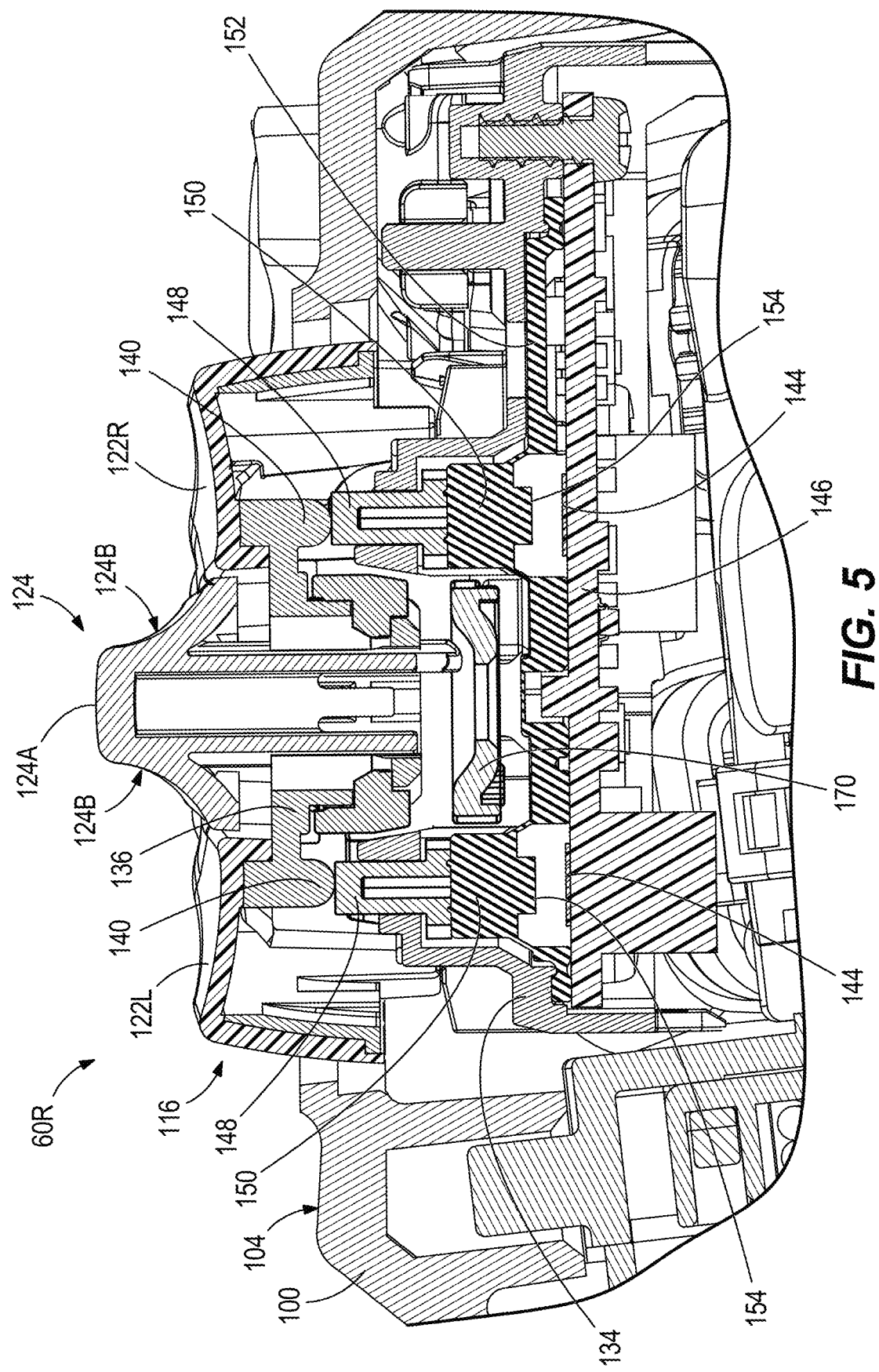
FIG. 5 is a cross-section of the right multi-function hand control, taken along line 5-5 of FIG. 3B.

With further reference to the cross-section of FIG. 5, the 5-way control 116 includes a frame or frame assembly including a fixed frame 134 and a movable frame 136. The fixed frame 134 can be integral with or otherwise fixedly secured to the housing 100. The movable frame 136 can be integral with or otherwise fixedly secured to the directional pad formed by the buttons 122L, 122R, 122U, 122D and movable therewith when the user actuates the directional pad. The movable frame 136 includes a plurality of actuator portions 140 that face into the housing 100 and toward electronic switching devices 144 (e.g., physical switches or switching portions formed on a printed circuit board PCB 146, for example by conductive traces). As illustrated, the actuator portions 140 selectively actuate the corresponding switching devices 144 indirectly rather than directly. In particular, each actuator portion 140 has a tip in contact with the axial end surface of a corresponding plunger 148 configured for reciprocating movement within the fixed frame 134. The opposite end of each plunger 148 is configured to actuate a movable portion 150 of a flexible membrane 152 that covers the switching devices 144. As shown, each movable membrane portion 150 is shaped as a block connected through living hinges of the membrane 152 (e.g., locally thickness-reduced portions that facilitate flexing and/or folding to accommodate the actuation movement). The membrane 152 can also act as a biasing member to restore the unactuated position (FIG. 5) following actuation of one of the buttons 122L, 122R, 122U, 122D of the directional pad. Switching contacts 154 are supported on the movable membrane portions 150 for selectively contacting and actuating the switching devices 144.

Figure 7:
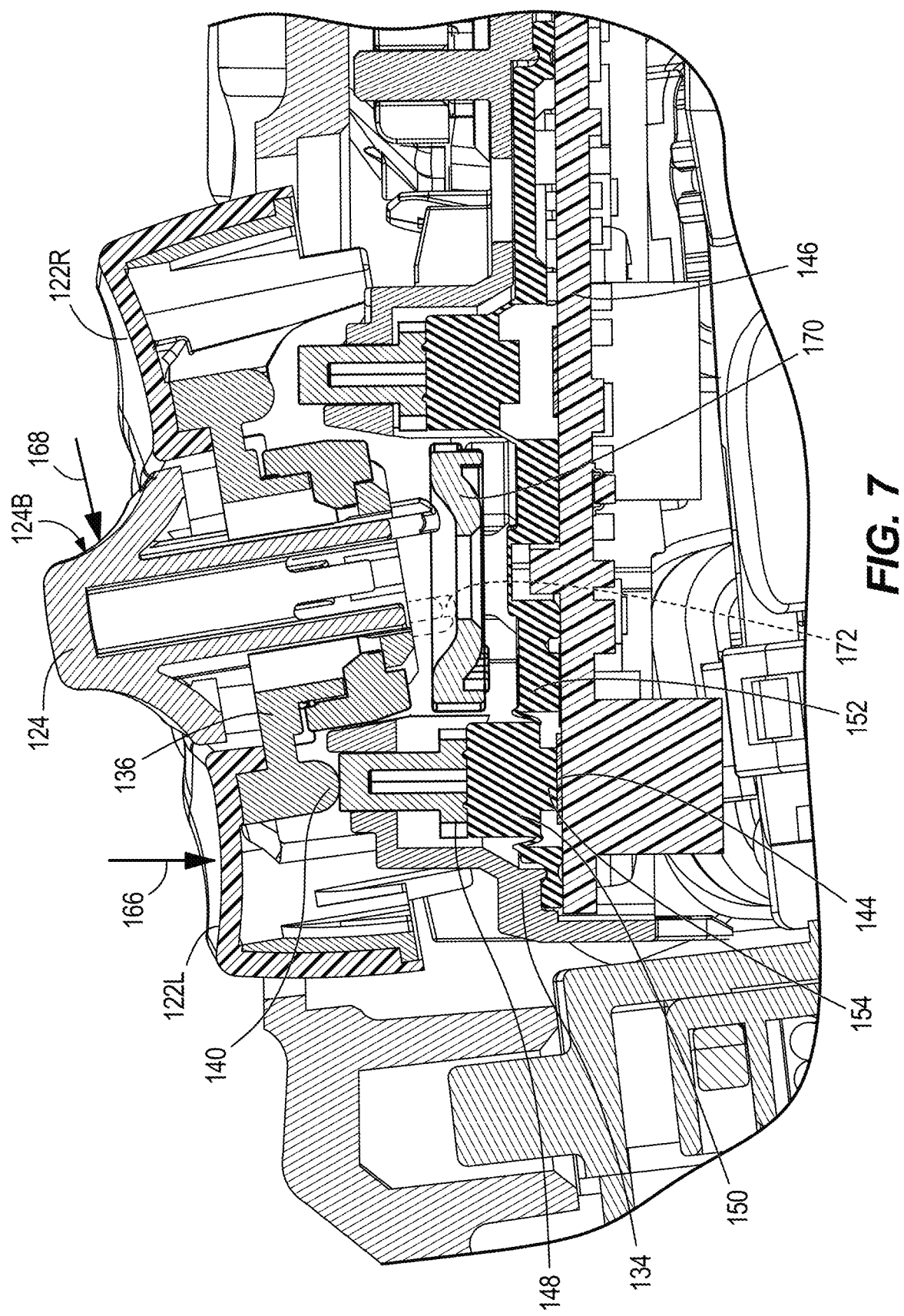
FIG. 7 is a cross-section of the right multi-function hand control similar to FIG. 5, but illustrating an actuated state of an inboard button.

Also shown in FIG. 5 is that the center button 124 has a shaft that forms a sliding interface with the movable frame 136. The interface is configured to maintain the prescribed orientation of the center button 124 about the longitudinal axis (e.g., of the center button shaft) that defines the sliding movement for actuation and return. An internal guide 170 is arranged between the internal end of the center button 124 and the membrane 152. The internal guide 170 has a concave upper surface in contact with a plurality of extended legs 172 of the center button 124. The legs 172 can have rounded tips that move along the concave upper surface during actuation of the directional pad buttons 122L, 122R, 122U, 122D. As such, the internal guide 170 defines the allowable motion path of the directional pad. Because the sliding interface between the center button 124 and the movable frame 136 is configured to only allow movement along the longitudinal axis, the center button 124 is generally captive to the directional pad buttons 122L, 122R, 122U, 122D and moves with them in a pivoting movement when any one of them is depressed to actuate (FIG. 7). Actuation of the center button 124 includes longitudinal movement of the center button 124 inward with respect to the directional pad, the fixed frame 134, the movable frame 136, and the housing 100. The internal guide 170 moves inward with the center button 124 when depressed. In particular, the internal guide 170 defines a sliding interface with the fixed frame 134. The internal guide 170 transfers movement to the membrane 152 (e.g., to multiple movable membrane portions 174 having switching contacts 176). Upon actuation, the movable membrane portion(s) 174 move down toward the PCB 146 so that at least one switching contact 176 carried by a movable membrane portion 174 establishes contact to a corresponding switching device 180 on the PCB 146. Some constructions provide parallel or redundant switching circuits for actuation by the center button 124, as it is capable of complex movement (i.e., pivoting with the directional pad in various directions, along with its own inward longitudinal movement for actuation). The PCB 146 can be configured to recognize actuation of the center button 124 regardless of whether the directional pad is manipulated at the same time the center button 124 is depressed. As described above with respect to the directional pad actuation, the membrane 152 can act as a biasing member to restore the unactuated position of the center button 124 upon release following actuation.

Figure 6:
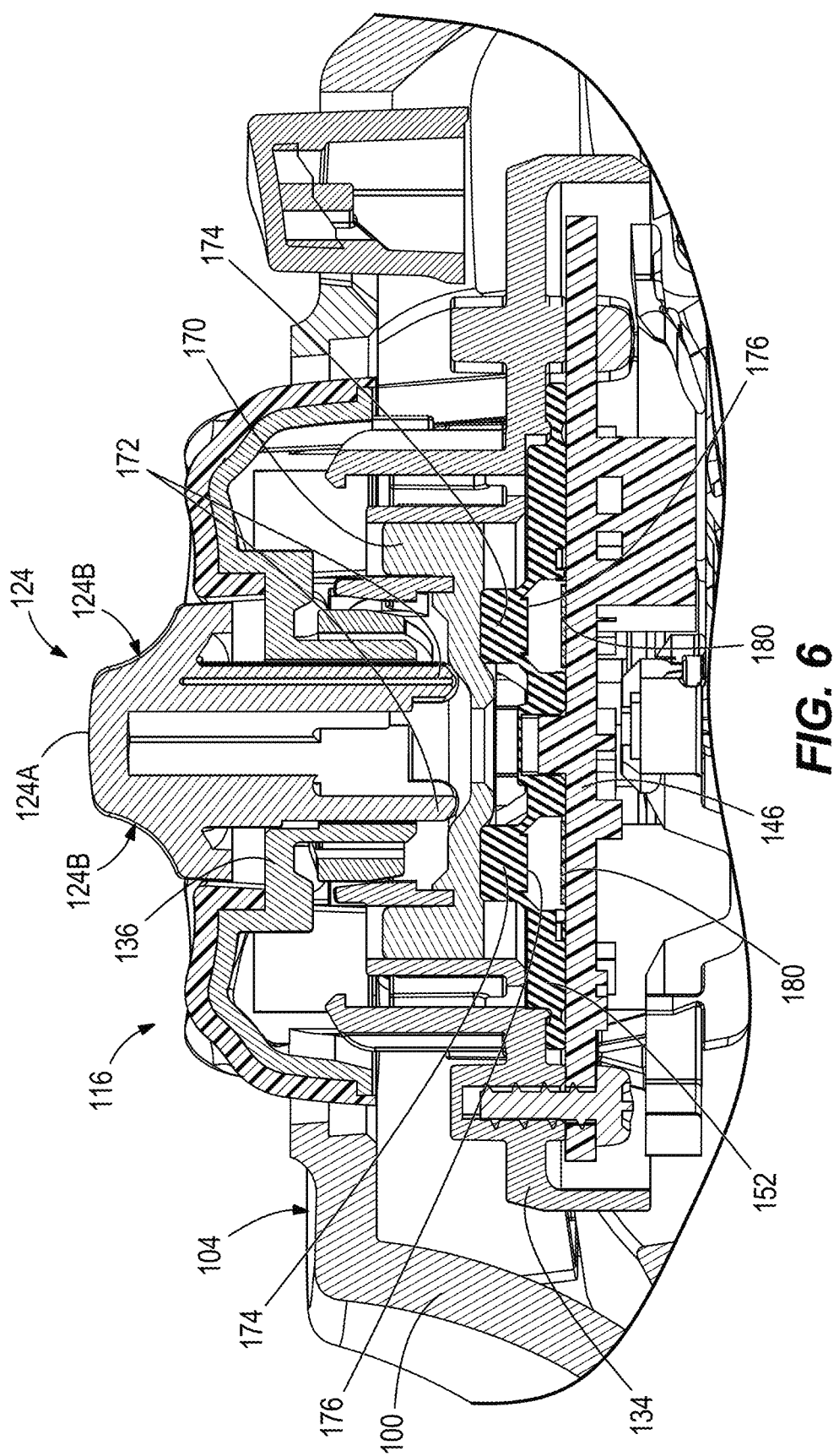
FIG. 6 is a cross-section of the right multi-function hand control, taken alone line 6-6 of FIG. 3B.

FIG. 7 illustrates actuation of the inboard or left button 122L of the right hand control 60R by a first input force indicated by the arrow 166. The input force 166 is incident on the outside surface of the button 122L and directed inward toward the PCB 146 (e.g., substantially perpendicular to the front surface 104 of the housing 100). However, the center button 124 is also configured to actuate the inboard or left button 122L by a second input force 168 that is instead applied to the opposite (outboard) one of the center button side surfaces 124B. In other words, the second input force 168 is substantially parallel to the front surface 104 of the housing 100. Thus, the user can actuate the inboard button 122L without having to apply any force to the outside surface of the button 122L. As such, the user's thumb can remain on the outboard side of the center button 124 (e.g., on or adjacent the outboard or right button 122R) while actuating the inboard button 122L. This mode of operating the inboard button 122L is particularly useful for minimizing the required amount of thumb movement and can help operators with smaller thumb reach to operate all parts of the 5-way control 116 while maintaining proper grasp on the hand grip 58R. Although described with respect to actuation of the inboard button 122L from outboard-to-inboard actuation of the center button 124 (which corresponds in a mirrored fashion to an actuation of the right button 88R by outboard-to-inboard actuation of the center button 90 on the left hand control 60L), the center button 124 may operate in a similar manner to actuate additional buttons 122R, 122U, 122D of the 5-way control 116. In other words, the center button 124 may facilitate any one or more of: actuation of the outboard or right button 122R by an outboard force applied at an inboard side of the center button 124, actuation of the up button 122U by an upward force applied at a bottom side of the center button 124, and actuation of the down button 122D by a downward force applied at a top side of the center button 124. The center button 124 thus controls its own function, while also acting as a multi-direction joystick for function(s) controlled by one or more of the adjacent buttons 122L, 122R, 122U, 122D. As already mentioned above, the configuration of the left 5-way control 80 of FIGS. 3A and 4A can be similar to that described above for the right hand 5-way control 116 described above and illustrated in FIGS. 5-7. It should also be noted explicitly that either or both of the 5-way controls 80, 116 can be provided with more or fewer than 5 total independent buttons. For example, the 5-way control(s) 80, 116 can be reduced in some constructions to 3-way controls. In such constructions, the center button 90, 124 is at least capable of being pressed directly inward for actuating its own switch, and separately capable of being pressed sideways toward the inboard button 88R, 122L for actuating the switch of the adjacent inboard button 88R, 122L to reduce the required reach from the outboard side hand position. If the operator desires, they may still reach to the inboard button 88R, 122L and actuate it directly.

Figure 8:
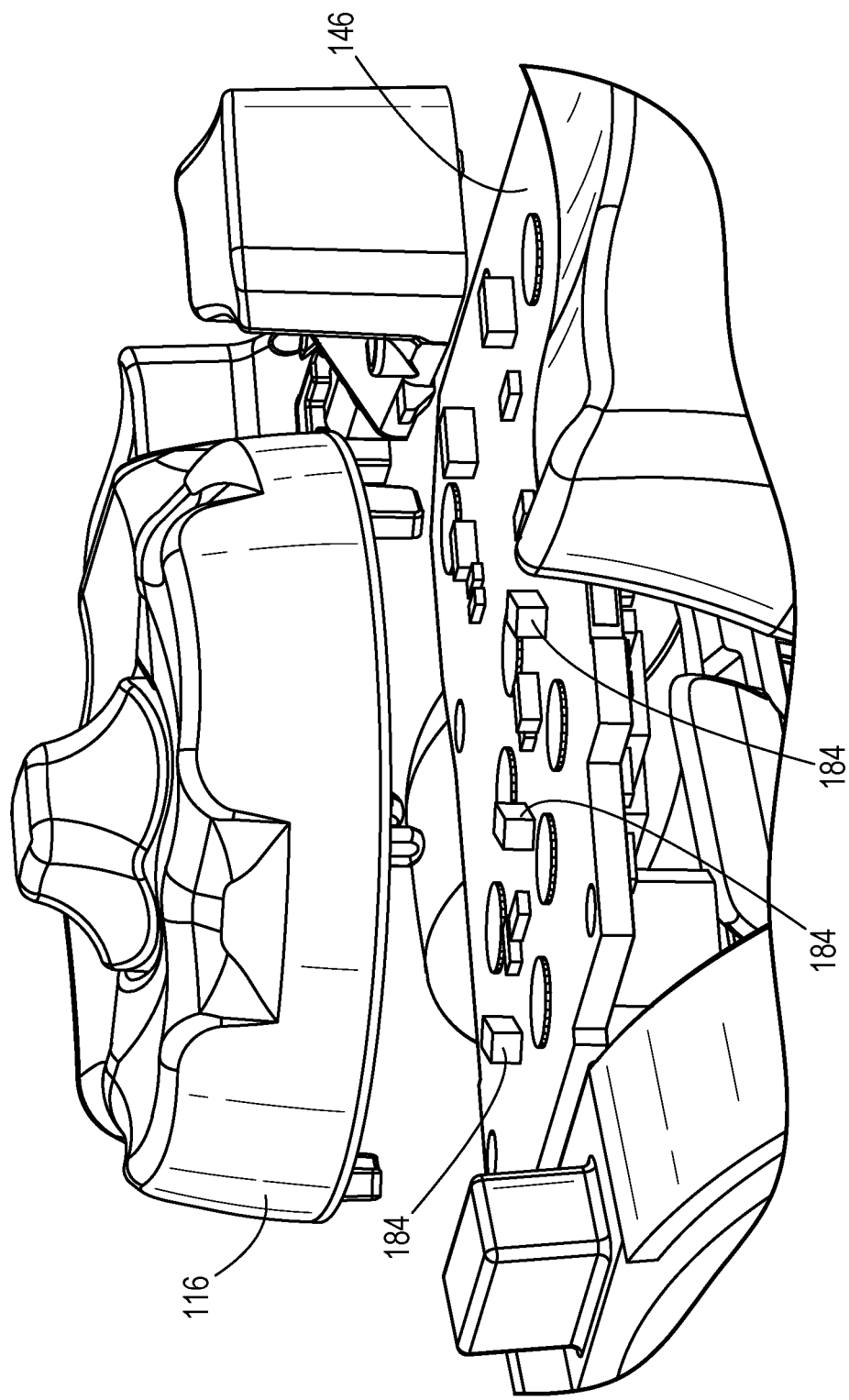
FIG. 8 is an exploded assembly view with a flexible membrane removed to illustrate LEDs on top of a printed circuit board within one of the hand controls.

Each of the 5-way controls 80, 116 can incorporate backlit icons corresponding to the various functions. The various buttons of the 5-way controls 80, 116 can be molded in a translucent material (e.g., plastic) and painted black. The icons to be illuminated are laser-etched through the black paint to let light through. In some constructions, there may be a white paint layer under the black and a clear paint over the black. The membrane (e.g., silicone rubber) can also be provided with translucent and opaque sections corresponding to the buttons to be illuminated. The membrane 152 is black in areas to mask unwanted light leak and diffuse-clear in areas to project light though the translucent portion of the buttons. The translucent areas diffuse the light to give a uniform brightness within each icon and among all the icons compared to each other. One or more LEDs 184 are surface-mounted on the PCB 146 to illuminate up through the interior of the buttons of the 5-way controls 80, 116 as shown in FIG. 8. This can include one LED 184 per button, or in some cases LEDs 184 that are shared among multiple buttons (e.g., two LEDs positioned on diagonals with respect to the directional pad buttons to illuminate the icons of the four directional pad buttons).

It should be appreciated that aspects of the present disclosure are particularly useful in touring motorcycles, although they may have applicability in a wide range of vehicles that may be provided with hand grips on a handlebar, including but not limited to cruiser or urban motorcycles, scooters, all-terrain vehicles, and some bicycles. Further, additional applicability may be found in vehicles with steering wheels, including passenger vehicles and trucks for consumer or commercial use. Even further, additional applicability may be found in handheld control devices or remote controllers for a variety of uses, both personal and industrial, wherever multi-function hand controls may be used.

Various aspects of the invention are set forth in the following claims.

What is claimed is:

1. A multi-function hand control for a vehicle, the multi-function hand control comprising:
   a housing configured for support on a handlebar, the housing having an inboard end, an outboard end, and a front surface configured to face a vehicle operator;
   a plurality of buttons configured for operation by the vehicle operator's thumb with the operator's hand positioned adjacent the outboard end of the housing, wherein the plurality of buttons includes an inboard button, an outboard button, and a center button between the inboard and outboard buttons,
   wherein each one of the plurality of buttons is operable from an at-rest position to an activated position by directly pressing inward on an outer surface thereof, and
   wherein the inboard button is additionally operable from its at-rest position to its activated position by pressing an outboard portion of the center button in a direction toward the inboard button.

2. The multi-function hand control of claim 1, wherein the outboard button is additionally operable from its at-rest position to its activated position by pressing an inboard portion of the center button in a direction toward the outboard button.

3. The multi-function hand control of claim 1, wherein the inboard and outboard buttons are formed integrally as part of a directional pad encircling the center button.

4. The multi-function hand control of claim 3, wherein the directional pad further includes a top button above the center button and a bottom button below the center button, the top button being operable from its at-rest position to its activated position by pressing a bottom portion of the center button in a direction toward the top button, and the bottom button being operable from its at-rest position to its activated position by pressing a top portion of the center button in a direction toward the bottom button.

5. The multi-function hand control of claim 3, wherein the center button has a tip that protrudes out beyond directional pad, the center button being operable from its at-rest position to its activated position by pressing the tip.

6. The multi-function hand control of claim 1, wherein the outer surfaces of the center button and the outboard button form a continuous concave profile configured to jointly receive and support the user's thumb.

7. The multi-function hand control of claim 1, wherein the center button protrudes outward from the front surface of the housing farther than the inboard and outboard buttons.

8. The multi-function hand control of claim 1, wherein the center button is pyramid-shaped including a plurality of sides, one of which provides the outboard portion, and a tip.

9. The multi-function hand control of claim 8, wherein each of the plurality of sides of the pyramid-shaped center button is concave.

10. A motorcycle comprising the multi-function hand control of claim 1, the motorcycle further comprising:
    a throttle-actuating right hand grip positioned adjacent the outboard end of the housing of the hand control, which is a right hand control;
    a left hand grip positioned at an opposite end of the handlebar; and
    a left hand control with a housing having an inboard end, an outboard end, and a front surface,
    wherein a plurality of buttons of the left hand control are configured for operation by an operator's left thumb with the operator's hand positioned adjacent the outboard end of the housing, the plurality of buttons of the left hand control including an inboard button, an outboard button, and a center button laterally between the inboard and outboard buttons,
    wherein each one of the plurality of buttons of the left hand control is operable from an at-rest position to an activated position by directly pressing inward on an outer surface thereof, and
    wherein the inboard button of the left hand control is operable from its at-rest position to its activated position, without any direct pressing on its outer surface, by pressing the center button in a direction toward the inboard button.

11. A multi-function hand control for a vehicle, the multi-function hand control comprising:
    a directional pad defining a plurality of individually selectable directional controls; and
    a center button provided at a center position between the plurality of individually selectable directional controls, the center button configured to be pressed inward for activation;
    wherein at least one of the plurality of individually selectable directional controls is selectable by movement of the center button away from the center position.

12. The multi-function hand control of claim 11, further comprising a housing supporting the directional pad and the center button, the housing configured for support on a handlebar and having an inboard end, an outboard end, wherein the at least one of the plurality of individually selectable directional controls selectable by movement of the center button away from the center position is an inboard button of the directional pad.

13. The multi-function hand control of claim 11, wherein each one of the individually selectable directional controls is selectable by a corresponding movement of the center button away from the center position.

14. The multi-function hand control of claim 11, wherein the center button has a tip that protrudes out beyond the directional pad.

15. The multi-function hand control of claim 11, wherein each of the plurality of individually selectable directional controls of the directional pad has an outer surface that cooperates with an outer surface of the center button to form a continuous concave profile configured to jointly receive and support the user's thumb.

16. The multi-function hand control of claim 11, wherein the center button is pyramid-shaped including a distal tip and a plurality of sides corresponding to the plurality of individually selectable directional controls of the directional pad.

17. The multi-function hand control of claim 16, wherein each of the plurality of sides of the pyramid-shaped center button is concave.

18. The multi-function hand control of claim 11, further comprising a movable frame movable with the directional pad, the center button being retained within the movable frame and limited to a sliding interface therewith.

19. The multi-function hand control of claim 11, wherein an inward end of the center button is in contact with a concave surface of an internal guide throughout a movement range of the directional pad, the internal guide being slidably displaceable in a longitudinal direction of the center button during actuation of the center button.

20. A motorcycle comprising the multi-function hand control of claim 11, the motorcycle further comprising:
a handlebar;
a throttle-actuating right hand grip on a right hand side of the handlebar;
a left hand grip positioned at a left hand side the handlebar, wherein the multi-function hand control is positioned adjacent an inboard end of one of the right hand grip and the left hand grip; and
an additional hand control positioned adjacent an inboard end of the other of the right and grip and the left hand grip,
wherein a plurality of buttons of the additional hand control are configured for operation by an operator's thumb, the plurality of buttons of the additional hand control including an inboard button, an outboard button, and a center button laterally between the inboard and outboard buttons,
wherein each one of the plurality of buttons of the additional hand control is operable from an at-rest position to an activated position by directly pressing inward on an outer surface thereof, and
wherein the inboard button of the additional hand control is operable from its at-rest position to its activated position, without any direct pressing on its outer surface, by pressing the center button of the additional hand control in a direction toward the inboard button.

* * * * *